Nov. 7, 1961  J. S. WHEELER, JR  3,007,488
CHECK VALVE
Filed July 2, 1959  5 Sheets-Sheet 1

Joseph S. Wheeler, Jr.
INVENTOR.

BY

ATTORNEYS

Nov. 7, 1961   J. S. WHEELER, JR   3,007,488
CHECK VALVE
Filed July 2, 1959   5 Sheets-Sheet 2
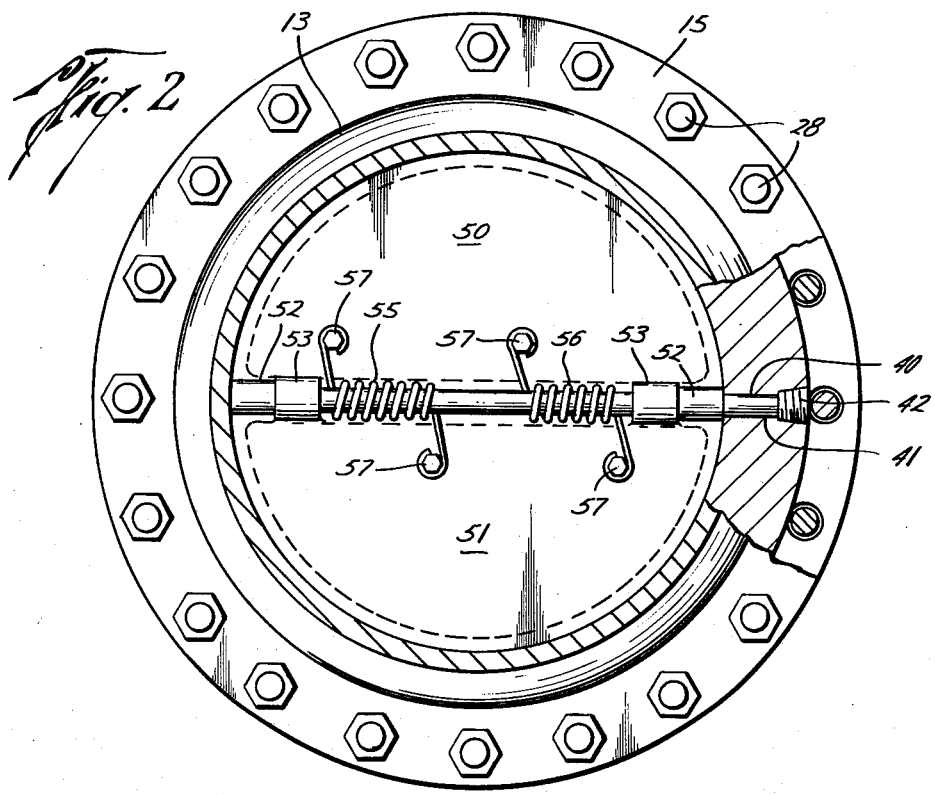
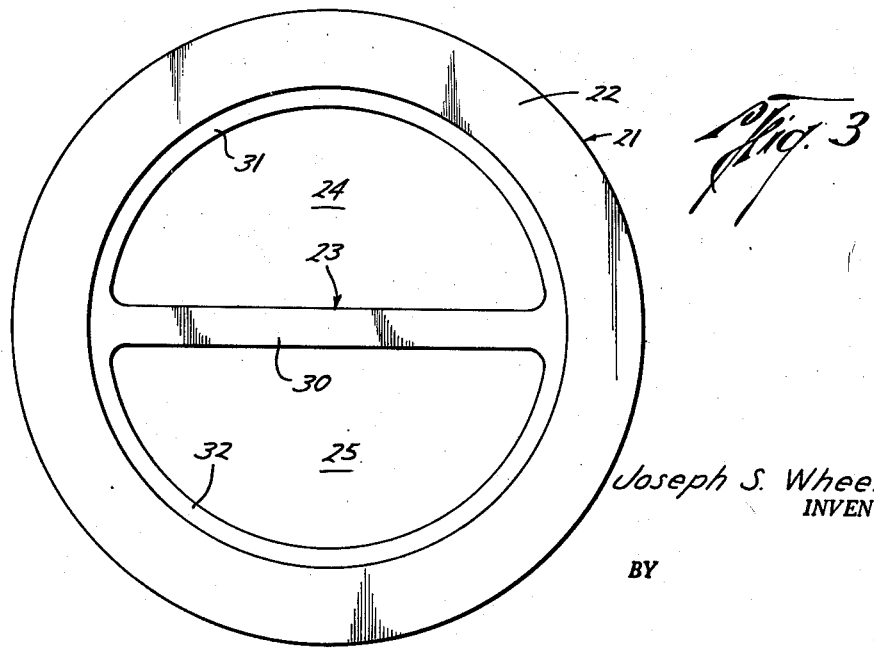
Joseph S. Wheeler, Jr.
INVENTOR.
BY
ATTORNEYS Nov. 7, 1961 J. S. WHEELER, JR 3,007,488
CHECK VALVE
Filed July 2, 1959 5 Sheets-Sheet 3

Joseph S. Wheeler, Jr.
INVENTOR.

BY

ATTORNEYS

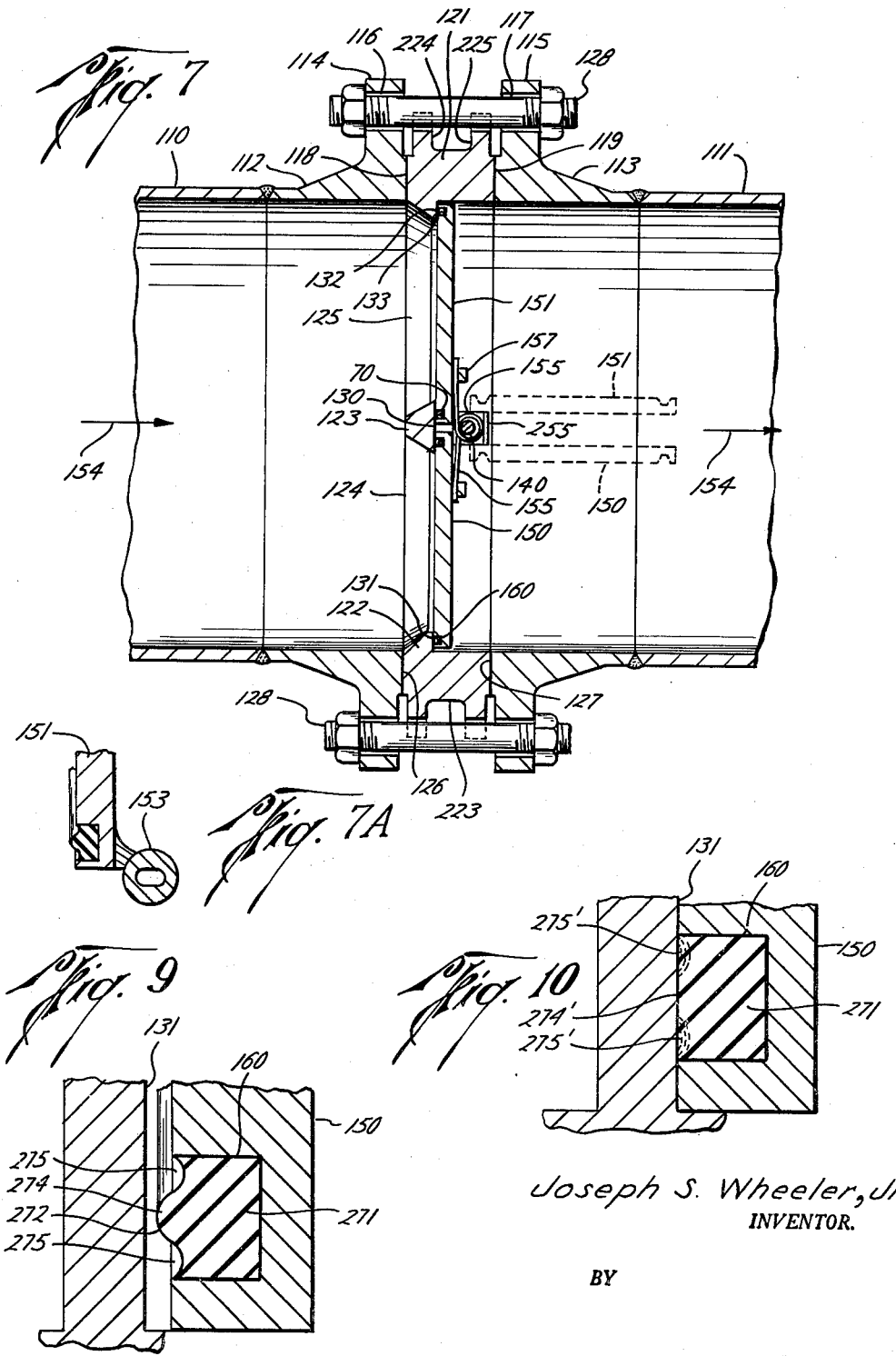

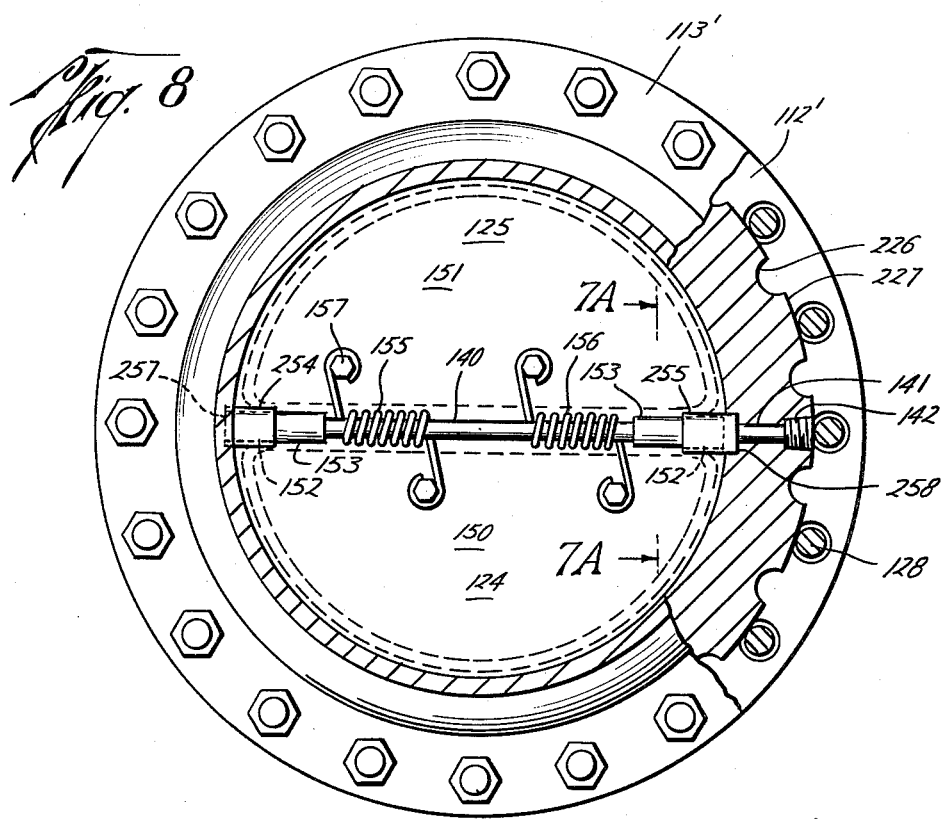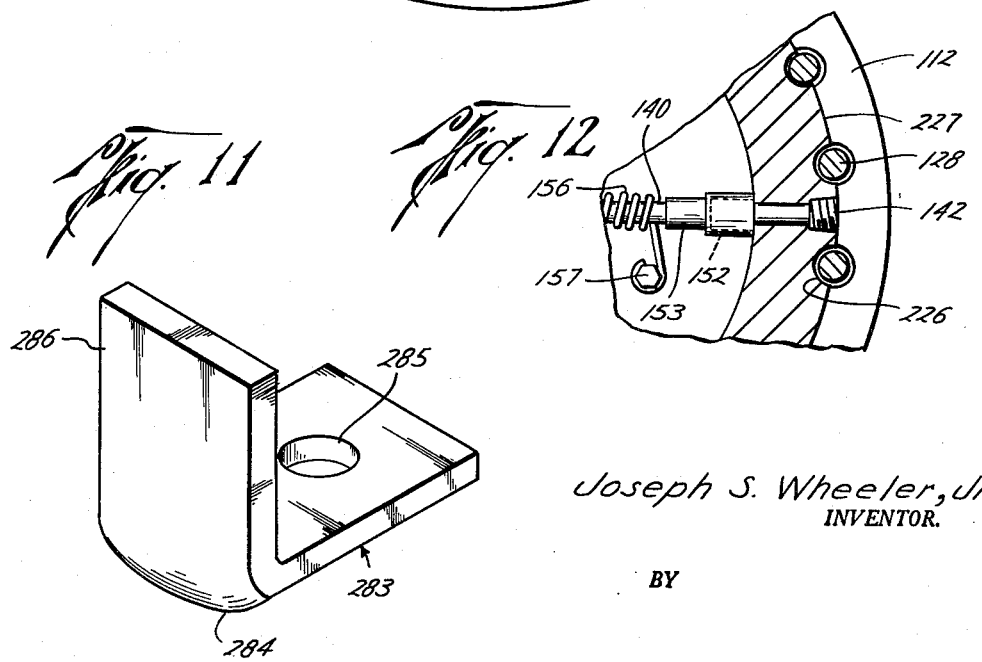

United States Patent Office 3,007,488
Patented Nov. 7, 1961

3,007,488
CHECK VALVE
Joseph S. Wheeler, Jr., Houston, Tex., assignor to Mission Valve and Pump Company, Houston, Tex., a corporation of Texas
Filed July 2, 1959, Ser. No. 824,514
5 Claims. (Cl. 137—515.7)

This invention pertains to valves and more particularly to check valves for fluid transmission pipe lines. This application is a continuation in part of my co-pending applications Serial No. 689,304 and Serial No. 739,250, the latter now abandoned.

With increasing diameters and pressures of pipe lines there has been an attendant increase in cost and weight of check valves used therein. There also results an increase in the expense of handling, installing and servicing such large valves.

It is the principal object of the invention to provide an inexpensive, light weight check valve of improved design and performance which can be easily and inexpensively handled, installed, and serviced.

According to the invention a valve body is provided having the general shape of a coupling flange which can be clamped between the coupling flanges on the adjacent ends of the pipe line. The valve closure means takes the form of two half-discs disposed with their straight sides adjacent and loosely pivotally mounted on a shaft extending diametrically across the valve body into sockets on the inside of the valve body. The valve seats comprise an annular shoulder extending around the inner periphery of the valve body and the copianar surface of a diametral rib formed or cast integral with the valve body and extending across the valve body in azimuthal alignment with the shaft.

By virtue of the free floating or loosely pivoted mounting of the valve closure members there is assured a seal with the valve seats. The diametral rib provides not only seats which seal with the straight sides of the closure members but also an additional support for the closure members. As a result the closure members need not be nearly as thick in order to resist any given pressure. The specific shape and mounting of the closure members allows them to open like a hinge and fold back flat against each other leaving a maximum clear flow passage without the necessity for providing any additional body cavity space of much larger internal diameter than the pipe line with which the valve is connected. The valve seat is between the ends or opposite faces of the body and is spaced sufficiently from the downstream and or face of the body so that when the valve is closed the entire unit can be withdrawn from the pipe line without removing the adjacent sections of pipe from the line.

Other objects and advantages of the invention will appear from the following description of preferred embodiments thereof wherein:

FIGURE 2 is an end view of the valve, partly in section;

FIGURE 3 is a view similar to FIGURE 2 showing the valve body alone;

Figure 1:
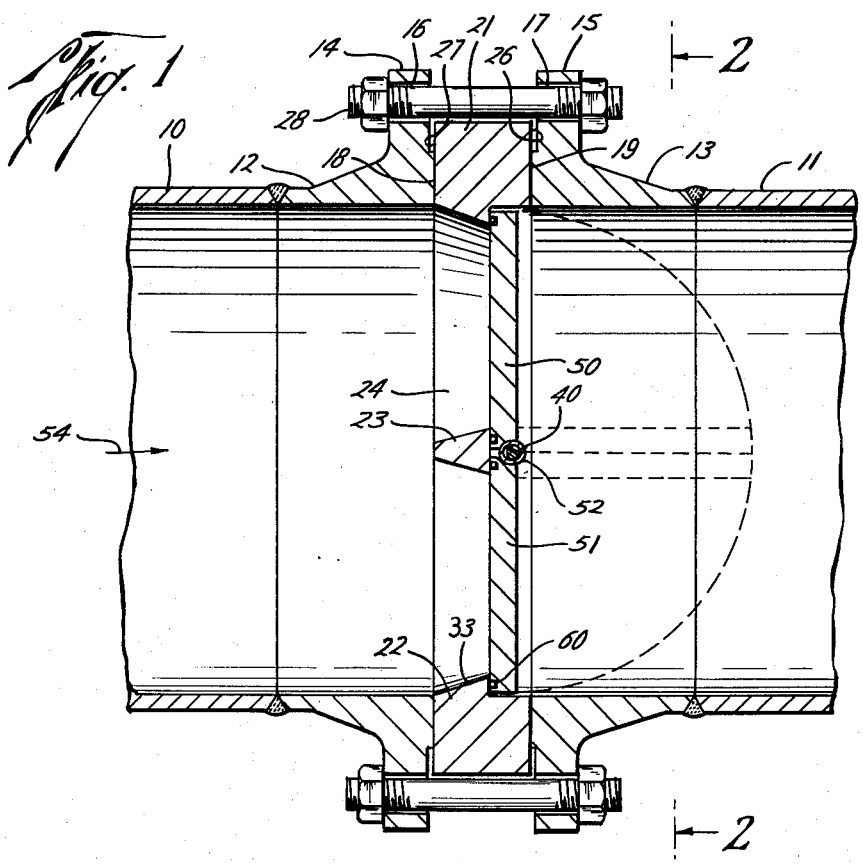
FIGURE 1 is an axial section through a portion of a pipe line including a valve embodying the invention.
Figure 6:
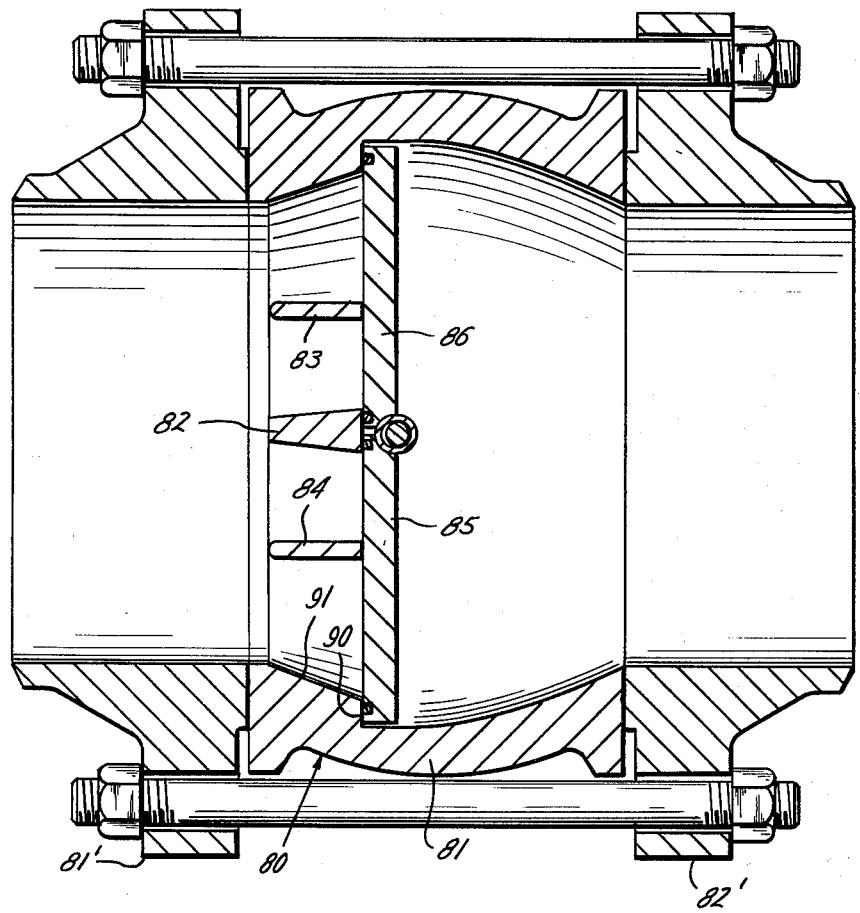
Figure 6A:
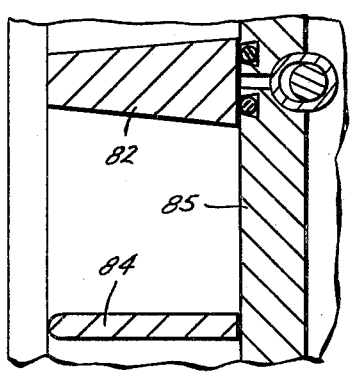

FIGURES 6 and 6A each is a view similar to FIGURE 1 showing a different modified form of the valve.

FIGURE 7 is an axial section through a portion of a pipe line including another modified form of valve embodying the invention;

FIGURE 7A is a section on line 7A—7A of FIGURE 8.

FIGURE 8 is a transverse cross-section through a portion of another pipe line having the same inner diameter as the pipe line of FIGURE 7 but with coupling flanges having a larger diameter bolt circle and having the valve of FIGURE 7 installed therein;

FIGURE 9 is an enlarged section showing the valve seal means in unseated condition;

FIGURE 10 is similar to FIGURE 9 except showing the seal in seated condition;

FIGURE 11 is a perspective view showing a modified valve closure angle stop; and, FIGURE 12 is a transverse section through a pipe line similar to that of FIGURE 7 showing a modified form of valve therein incorporating the FIGURE 11 angle stop.

Referring now to FIGURE 1 there is shown a portion of a pipe line including pipes 10, 11 to which couplings 12, 13 are welded. The couplings have the same inner diameter as the pipes. The couplings are provided with flanges 14, 15 each having a plurality of azimuthally spaced apart bolt holes 16, 17 therethrough. The flange ends of the couplings are provided with seating surfaces 18, 19, the outer portions of the ends of the couplings being relieved below the seating surfaces where the bolt holes are located.

Between the flanges of the couplings is disposed valve body 21. The valve body has the shape of a divided ring, that is, as shown also in FIGURES 3, it includes a circular or ring shaped portion 22 and a diametral rib 23 dividing the space inside the ring with two separate passages 24, 25, each of semi-circular cross-section. The end faces 26, 27 of the ring portion of the valve body provide seating surfaces to engage and seal with seating surfaces 18, 19 of the coupling flanges when bolts 28 are tightened.

The rib 23 has a plane surface 30 disposed between the end faces of the valve ring. The adjacent parallel longitudinal sides of surface 30 provide straight valve seating surfaces which merge with semi-circular seating surfaces 31, 32 formed on annular shoulder 33 on the inner periphery of the valve ring. There is thus provided a continuous valve seat around each of the passages 24, 25.

A shaft 40, best shown in FIGURE 2, extends diametrically across the valve ring parallel to rib 23 and spaced therefrom. The ends of the shaft are received in holes such as 41 in the valve ring. The outer ends of the holes are counterbored and taper threaded to receive screw plugs 42 to close and seal same.

A pair of semi-circular disc shaped valve closures 50, 51, are each provided with a pair of bearings 52, 53, disposed on shaft 40. As shown in FIGURE 1, these bearings are of larger inner diameter in the direction perpendicular to the discs than the outer diameter of the shaft so as to make a loose fit. By this means the closures are pivotally mounted for floating movement between a closed position in which they lie against the valve seats around the passages 24, 25 as shown in full lines in FIGURE 1 and open positions at angles thereto as shown in dashed lines. If desired a stop may be provided on one or both closures to prevent them from coming into full engagement with each other when fully open so as to insure that they will close upon reversal of line pressure. Normal flow direction is indicated in FIGURE 1 by arrow 54. However it is preferred to bias the closures to closed position by means of a pair of helical torsion springs 55, 56 disposed around shaft 40 and secured at their opposite ends to the closures by screws 57. The heads of the screws will incidentally serve as stops to prevent the closures from coming into full engagement with each other. The spring coils have a larger inner diameter than the outer diameter of the shaft 40 so as to maintain the floating relationship between the shaft and the closures. This insures proper seating of the closures on their seats by allowing them to move until coplanar with the seats.

Around the edge of each valve closure where the closure engages its seat is disposed a channel such as 60 having a trapezoidal cross-section in which is disposed a synthetic rubber packing material bonded in place. The retrograde inclination of the channel walls serves to provide additional retention for the packing material. The packing will protrude slightly out of the channel when the valve is open but does not quite fill the channel at the edges so when the valve is closed there is space for the packing to flow into and the valve closures can move into full metal to metal contact both inside and outside the packing.

Figure 4:
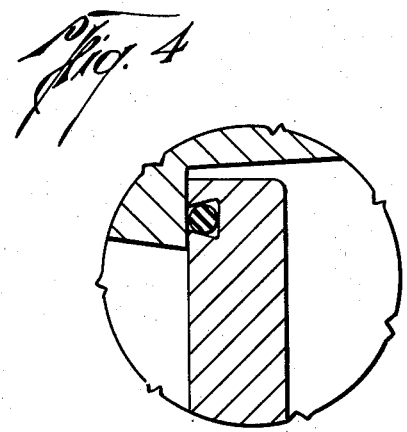
FIGURES 4 and 5 are axial sections through a portion of a closure and seat of the valve showing alternative forms of sealing arrangements.
Figure 5:
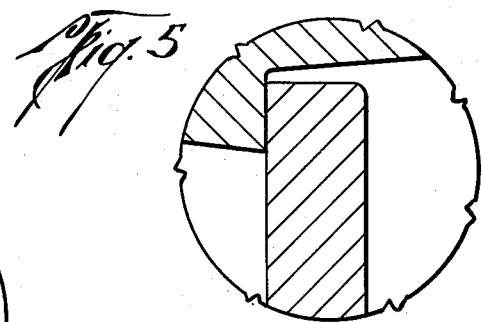

Alternative packing means can be used, for example an O-ring as shown in FIGURE 4, or a plain metal to metal seal as shown in FIGURE 5.

As shown in FIGURE 1, when the valve is closed all portions of the valve lie within a volume bounded by the periphery and end faces of the valve body ring so that the valve can be installed and removed by sliding it laterally between the couplings 12, 13 when sufficient of the bolts have been removed. The body is held in register with the couplings by the bolts when the valve is in use. Instead of a smooth cylindrical periphery as shown, the valve body ring might be scalloped so as to protrude between the bolts, e.g., to the same diameter as the couplings. If desired the body ring could have a smooth cylindrical periphery of the same diameter as the couplings and be provided with similar bolt holes. The shape shown is preferred because of its light weight and ease of assembly and disassembly, no azimuthal registry of holes being required in assembly and fewer bolts having to be removed in order to allow removal of the valve from the pipe line.

It would also be possible to provide packing rings or gaskets between the end faces of the couplings and the ends of the valve body ring but this would complicate assembly and disassembly so that the plain metal to metal contact shown is preferred.

It will be noted from FIGURE 1 that the valve closures have a slightly smaller radius than the pipe line and couplings. This is to insure clearance in case the valve body ring is not in perfect registry with the couplings, as is possible due to the usual clearances provided in the coupling bolt holes. The shoulder 33 projects far enough inwardly to provide sufficient overlap between closures and seats. The shoulder 33 is of triangular cross-section which, together with the triangular section of rib 23, provide a streamlined wall for flow passages 24, 25 with respect to the normal direction of flow. However, there is nevertheless a slight reduction in cross-sectional area available for fluid flow through the valve. If a full cross-section is desired the modified construction shown in FIGURE 6 may be employed.

Referring to FIGURE 6, there is shown a valve having a body 80 disposed between two pipe line couplings 81', 82' in the same way as the valve of FIGURE 1 is assembled in the pipe line thereshown. Valve body 80 includes a ring portion 81, a diametral rib 82, and a plurality of chord-like ribs 83, 84. The ends of the valve body ring having the same inner diameter as the couplings but the interior of the ring tapers to a larger inner diameter so as to accommodate larger valve closures 85, 86. Closures 85, 86 seat and seal against seats provided by rib 82 and annular shoulder 90, and are additionally supported by ribs 83, 84. Preferably the entire valve body, including ring 81, and ribs 82, 83, 84 is cast integral.

Valve body 80 is longer than that shown in FIGURE 1, in relation to the pipe diameter, so that the valve closures 85, 86 do not extend outside the valve body until they have pivoted about half way toward the full open position. During their initial opening movement the closures travel through the globular slightly enlarged body cavity inside the valve body ring. By the time they extend outside the ring, the closures have come together to such an extent that they clear the inside of the couplings.

The valve body shape shown in FIGURE 6 allows the cross-sectional area of the flow passages bounded by the valve seats to be as large or larger than the area of the couplings and other parts of the pipe line. The tapering entrance throat 91 enlarges in cross-section rapidly so that the area reduction due to the presence of the ribs 82, 83, 84 is compensated. There results substantially no flow constriction at the valve.

The bearings for the valve closures 85, 86, make a loose fit with their supporting shaft, but instead of being elongated only in the direction perpendicular to the closure as in FIGURE 1, they may be of circular cross-section, as shown in FIGURE 6. In the FIGURE 1 embodiment it is particularly desirable to have the bearings elongated only in the direction perpendicular to the closure so as to fully constrain the closures with respect to motion parallel to the plane of the closures due to the limited space available at the peripheries of the closures inside the valve body. In the FIGURE 6 embodiment however, where the body is larger, it is not essential to fully constrain the closure with respect to motion parallel to the planes of the closures and the less expensive circular cross-section bearings shown can be used, if desired. It is obvious that the bearing shape of FIGURE 1 could be used in the FIGURE 6 embodiment if desired, as shown in FIGURE 6A.

Except as noted the FIGURE 6 valve construction is the same as that of FIGURE 1. The full flow features of the FIGURE 6 construction can be used without the presence of the supplemental supporting ribs 83, 84, the latter being useful primarily in connection with high pressure valves, although with a full flow valve there is inherently a larger closure area to be supported. The valve shown in FIGURE 1 is approximately quarter scale and is designed for service handling pressures up to 160 p.s.i. By adding integral supplemental ribs it can readily be adapted for 600 p.s.i. without increasing the closure thickness.

Further modifications of the construction of FIGURES 1 and 2 are shown in FIGURES 7 through 12. Since the structure is generally the same, like parts have been given the same number except that one hundred has been added to the parts of FIGURES 7 through 12. Other parts of FIGURES 7 through 12 bear reference numbers in the two hundreds. In view of the foregoing it is unnecessary to repeat the description of the like parts and the description will be limited to the points of difference.

As is best shown in FIGURE 7, ring shaped portion 122 of valve body 121 has a circular recess 223 therearound, whereby the outer periphery of the ring comprises two circular flange-like structures 224, 225, one to either side of recess 223. Recess 223 contributes to the lightness in weight of the valve, which lightness in weight is achieved in the main by the fact that the valve body 121 is axially thin, between faces 126, 127, and is diametrally small, no portion of the valve body extending radially beyond the bolts 128.

As best shown in FIGURE 8, in order that the valve may be used interchangeably with a plurality of types of pipes 110, 111 and/or couplings 112, 113 the outer peripheral flanges 224, 225 of ring 121 are provided with a plurality of semicircular recesses 226 spaced therearound. The recesses 226 are spaced corresponding to the spacing of bolts 128. Between adjacent of the recesses 226 there are the non-recessed peripheral surfaces 227. Now, comparing FIGURE 7 with FIGURE 8, the bolts 128 are shown disposed within the recesses 226 in FIGURE 7 and upon the surfaces 227 in FIGURE 8. Since the couplings of FIGURE 8 differ from the couplings 12, 13 of FIGURE 7, the couplings in FIGURE 8 corresponding to couplings 112, 113 of FIGURE 7 are designated by reference numerals 112', 113', respectively.

Couplings 112, 113 and 112', 113' differ in that the diameters of the bolt circles of bolts 128 differ. There may be other differences between the couplings and flanges, e.g., difference in outer diameter. For example, flanges 112, 113 may be "150 Series" flanges (sometimes designated "15 Series") while flanges 112', 113' may be "300 Series" flanges (sometimes designated "30 Series"). At any rate, the same valve may be installed between flanges of different types having differing bolt circles, in one case the bolts being disposed within the outer flange recesses and in the other case the bolts being disposed against the flange peripheries between the recesses.

As best shown in FIGURES 7 and 7A the bearings 152, 153 of each closure are out of line with the plane of the closure so that when the valve is open so that the closures are perpendicular to the seats around passages 124, 125 there is a space equal to the bearing diameters between the backs of the closures. An angle stop 254, 255 is disposed in the space between the backs of the closures near each end of the shaft 40.

Each angle stop 254, 255 (see FIGURE 8) is in the form of a rectangular bar bent into the shape of an L. The horizontal portion of each stop has a perforation to receive shaft 140 therethrough. Ring 122 has, as its radial inner surfaces about the inner ends of the holes 141, a pair of opposite recesses 257, 258, each of the recesses being rectangular and of dimensions to receive the horizontal portion of one of the angle stops. The horizontal portions of the stops are held in place in the recesses by shaft 140 disposed therethrough and by the adjacent bearings 152, 153 of the closures. The vertical portions of the angle stops are disposed parallel to shaft 140, but spaced therefrom, as shown in FIGURE 7, and extend to between the positions of the closures 150, 151 as represented by dashed lines in FIGURE 7. Stops 254, 255 serve as means for preventing closures 150, 151 from moving beyond their positions perpendicular to the seats around passages 124, 125, so that fluids in pipe 111 may enter between the back-to-back closures when the valve is open and cause closing of the valve should the biasing means, not yet described, of the closure means become inoperative.

Normal flow direction is indicated in FIGURE 7 by arrows 154. Reversal of flow will cause fluids to enter between the back-to-back closures and force them closed. However it is preferred to bias the closures to closed position by means of a pair of helical torsion springs 155, 156 disposed around shaft 140 and secured at their opposite ends to the closures by screws 157. The spring coils have a larger inner diameter than the outer diameter of the shaft 40 so as to maintain the floating relationship between the shaft and the closures. This insures proper seating of the closures on their seats by allowing them to move until coplanar with the seats.

Referring now to FIGURES 11 and 12, there is shown a modified form for the angle stops 254, 255 which appear in FIGURES 7 and 8. In FIGURE 12 the recesses 257, 258 of the FIGURE 8 embodiment are absent. The angle stops, only one, angle stop 283, being shown, each have the same general L shape as angle stops 254, 255. However, the outer faces 284 of the perforate part of the L is convexly curved to fit flush against the inner side of ring 121, being shown in that position in FIGURE 12. The circular perforation 285 freely receives the shaft 140. The outer angular part 286 of the stop is rectangular similarly as the corresponding parts of stops 254, 255. The curved surface 284, being held against the corresponding curved ring interior by a bearing 152, is held against turning and the stop 283 has a function identical with that of stops 254, 255.

Referring again to FIGURE 7, around the edge of each valve closure where the closure engages its seat surface around passage 124 or 125 there is a channel such as 160 (see FIGURES 9, 10), the channel having a square or rectangular cross-section. The channels are substantially filled with a synthetic rubber packing material 271 having a shaped contour across the mouths of the channels such as at 272. The shaped contour of the packing material includes a convex curved rib 274 along the center of the channel and a concave curved trough 275 along the sides of the channel at each side of rib 274. The curves of rib 274 and troughs 275 to either side thereof are smoothly merged to make contoured surface 272.

In FIGURE 9 packing material 271 is shown in the relaxed or non-sealing condition, the seat 131, for example, being spaced from closure 150 and the rib 274 being spaced from seat 131. In FIGURE 10, the packing material 271 is shown with its contoured surface compressed, closure 150 being against seat 131, shown by way of example, to force rib 274 into the body of packing material 271, the compression of the packing material causing flow of packing material to totally or substantially eliminate the two troughs 275. Rib 274 and troughs 275 are designated by reference numerals 274' and 275', 275' in FIGURE 10 to indicate their flattened compressed forms. The spaces within the channels 160 provided by troughs 275 provide space for the material of rib 274 to flow into when compressed, the closure 150 (or 151) seating substantially flushly upon the seat surface around passage 124 (or 125) when the valve is closed.

The present application is directed primarily to various features of internal construction of the valve. For example the bonding of the packing material 271 in channels 160, as described in connection with the sealing material of FIGURE 1, makes it unnecessary to provide mechanical retention as for the O ring seal of FIGURE 4. The elongated cross-section or slot shaped bearings for the closures, as described in connection with the FIGURE 1 embodiment, which, while constraining the closures laterally allow them to float transversely, enables the closures to seat flush against the flat seating surfaces so as to avoid extrusion of the packing material between closures and seats. The angle stops, limiting the degree of opening of the closures to ninety degrees, not only space the closures apart and prevent them from entering into mutual oscillation, but take up the transverse play in the bearings so as to reduce vibration and serve as thrust bearings. Other features of the valve are covered by my prior copending applications Serial No. 689,304 filed October 10, 1957, and Serial No. 739,250 filed June 2, 1958, the latter now abandoned, covering respectively the full flow passage construction of FIGURE 6 and the cooperation of the valve ring with the coupling flanges, the present application being a continuation-in-part of said prior applications.

While preferred embodiments of the invention have been shown and described, many modifications thereof can be made by one skilled in the art without departing from the spirit of the invention and it is desired to protect by Letters Patent all forms of the invention falling within the scope of the following claims.

I claim:

1. A check valve comprising, a divided ring body including a rib extending diametrically thereacross dividing the opening through the ring body into two passages, a valve seat formed on said rib and a web around each of said two passages, a pair of semi-circular valve closures each for seating on one of said seats to close one of said passages, a shaft removably disposed diametrically across said ring body parallel with said rib and spaced therefrom, each said closure having a straight diametric side with hinges thereon which pivotally support the closures on said shaft, the holes through said hinges being greater in size than the diameter of said shaft in at least a direction perpendicular to said valve seat with the closures seated to permit limited translation of said valve closures, spring biasing means carried about said shaft and urging the valve closures toward seated position, and stop means carried about said shaft and limiting opening movement of said valve closures.

2. A check valve comprising, a divided ring body including a rib extending diametrically thereacross dividing the opening through the ring body into two passages, a valve seat formed on said rib and a web around each of said two passages, a pair of semi-circular valve closures each for seating on one of said seats to close one of said passages, a shaft removably disposed diametrically across said ring body parallel with said rib and spaced therefrom, each said closure having a straight diametric side with hinges thereon which pivotally support closures on said shaft, the holes through said hinges being greater in size than the diameter of said shaft in at least a direction perpendicular to said valve seat with the closures seated to permit limited translation of said valve closures, spring biasing means carried about said shaft and urging the valve closures toward seated position, stop means carried about said shaft and limiting opening movement of said valve closures, said shaft ends positioned in holes extending diametrically through said ring body, and removable closures in said holes confining said shaft therebetween and sealing said holes.

3. A check valve comprising, a divided ring body including a rib extending diametrically thereacross dividing the opening through the ring body into two passages, a valve seat formed on said rib and a web around each of said two passages, a pair of semi-circular valve closures each for seating on one of said seats to close one of said passages, a shaft removably disposed diametrically across said ring body parallel with said rib and spaced therefrom, each said closure having a straight diametric side with hinges thereon which pivotally support the closures on said shaft, the holes through said hinges being greater in size than the diameter of said shaft in at least a direction perpendicular to said valve seat with the closures seated to permit limited translation of said valve closures, spring biasing means carried about said shaft and urging the valve closures toward seated position, stop means carried about said shaft and limiting opening movement of said valve closures, said stop means comprising a pair of L shaped members each having a perforation through one leg thereof through which said shaft is disposed, each perforated leg positioned adjacent the ring body wall and having a surface cooperating with a surface on the ring body to prevent rotation of the stop means about said shaft, the spaces between the outermost hinges of said closures and ring body being substantially the same dimension as the thickness of said perforated leg whereby the hinges hold the stop means adjacent the ring body wall.

4. A check valve comprising, a divided ring body including a rib extending diametrically thereacross dividing the opening through the ring body into two passages, a valve seat formed on said rib and a web around each of said two passages, a pair of semi-circular valve closures each for seating on one of said seats to close one of said passages, sealing means around the face of each said closure which seats on said seat surface around a passage when the valve is closed, each said sealing means comprising a continuous groove around the sides of a closure face adapted to abut said seat surface when the closure is mounted thereagainst, a body of packing material bonded in said groove and having a contoured surface including a raised rib and a side trough along the mouth of said groove, said raised rib extending out of said groove when the valve is open and said rib is not against a seat, said rib being forced into said groove when said valve is closed and abuts a seat, a shaft removably disposed diametrically across said ring body parallel with said rib and spaced therefrom, each said closure having a straight diametric side with hinges thereon which pivotally support the closures on said shaft, the holes through said hinges being greater in size than the diameter of said shaft in at least a direction perpendicular to said valve seat with the closures seated to permit limited translation of said valve closures, spring biasing means carried about said shaft and urging the valve closures toward seated position, and stop means carried about said shaft and limiting opening movement of said valve closures.

5. A check valve comprising, a divided ring body including a rib extending diametrically thereacross dividing the opening through the ring body into two passages, a valve seat formed on said rib and a web around each of said two passages, a pair of semi-circular valve closures each for seating on one of said seats to close one of said passages, sealing means around the face of each said closure which seats on said seat surface around a passage when the valve is closed, each said sealing means comprising a continuous groove around the sides of a closure face adapted to abut said seat surface when the closure is mounted thereagainst, a body of packing material bonded in said groove and having a contoured surface including a raised rib and a side trough along the mouth of said groove, said raised rib extending out of said groove when the valve is open and said rib is not against a seat, said rib being forced into said groove when said valve is closed and abuts a seat, a shaft removably disposed diametrically across said ring body parallel with said rib and spaced therefrom, each said closure having a straight diametric side with hinges thereon which pivotally support the closures on said shaft, the holes through said hinges being greater in size than the diameter of said shaft in at least a direction perpendicular to said valve seat with the closures seated to permit limited translation of said valve closures, spring biasing means carried about said shaft and urging the valve closures toward seated position, and stop means carried about said shaft and limiting opening movement of said valve closures, said stop means comprising a pair of L shaped members each having a perforation through one leg thereof through which said shaft is disposed, each perforated leg positioned adjacent the ring body wall and having a surface cooperating with a surface on the valve body to prevent rotation of the stop means about said shaft, the spaces between the outermost hinges of said closure members and ring body being substantially the same dimension as the thickness of said perforated leg whereby the hinges hold the stop means adjacent the ring body wall, said shaft ends positioned in holes extending diametrically through said ring body, and removable closures in said holes confining said shaft therebetween and sealing said holes.

References Cited in the file of this patent

UNITED STATES PATENTS

| | | |
|---|---|---|
| 486,600 | McGowan | Nov. 22, 1892 |
| 1,238,878 | Bravo | Sept. 4, 1917 |
| 1,603,123 | Kuehne | Oct. 12, 1926 |
| 2,358,101 | Randall | Sept. 12, 1944 |
| 2,510,417 | Rehklau | June 6, 1950 |
| 2,831,499 | Myron | Apr. 22, 1958 |
| 2,886,062 | Wheatley | May 12, 1959 |

FOREIGN PATENTS

| | | |
|---|---|---|
| 295,710 | Switzerland | Mar. 16, 1954 |